United States Patent [19]

Espenschied

[11] 4,094,211
[45] June 13, 1978

[54] HYDRAULIC SYSTEM FOR AN AUTOMATIC TRANSMISSION OF AN AUTOMOTIVE VEHICLE

[75] Inventor: Helmut Espenschied, Ludwigsburg, Germany

[73] Assignee: Robert Bosch GmbH, Stuttgart, Germany

[21] Appl. No.: 715,433

[22] Filed: Aug. 18, 1976

[30] Foreign Application Priority Data

Aug. 20, 1975 Germany .............................. 2537006

[51] Int. Cl.² .......................................... B60K 41/18
[52] U.S. Cl. ...................................... 74/868; 74/866
[58] Field of Search .................. 74/866, 867, 868, 869

[56] References Cited
U.S. PATENT DOCUMENTS

| 3,724,295 | 4/1973 | Wakamatsu et al. | 74/866 |
| 3,726,157 | 4/1973 | Marumo | 74/866 X |
| 3,732,755 | 5/1973 | Beig et al. | 74/866 |
| 3,937,108 | 2/1976 | Will | 74/866 |

Primary Examiner—Samuel Scott
Assistant Examiner—Lance W. Chandler
Attorney, Agent, or Firm—Michael J. Striker

[57] ABSTRACT

An automotive vehicle has an automatic transmission to which fluid is supplied from a source through a control valve having a body which is displaceable to control the flow of the fluid to the load constituted by this tranmission. A plurality of binarily stepped pilot faces are provided on one side of the valve body and the other side is connectable to the source of fluid pressure. A plurality of pressurizable chambers at each of the surfaces are each connected via a respective line to a respective solenoid valve itself connected to the high-pressure side of this system. Binary actuation of these pilot surfaces via the solenoid valves in accordance with motor speed allows the transmission very smoothly to be upshifted and downshifted.

15 Claims, 5 Drawing Figures

HYDRAULIC SYSTEM FOR AN AUTOMATIC TRANSMISSION OF AN AUTOMOTIVE VEHICLE

BACKGROUND OF THE INVENTION

The present invention relates to a hydraulic pressure-control system. More particularly this invention concerns such a system usable for controlling a vehicular automatic transmission.

A standard automotive transmission of the automatic type has various hydraulically actuated clutches and brakes which are operated by means of a switching pressure that changes with the load. In such arrangement it is necessary to vary the switching pressure with the loading of the engine and, as much as possible, of the torque converter so that loading peaks on the transmission and the vehicle during shifting operations are largely eliminated. Such loading peaks put a very large strain on various components of the drive train, and also cause the vehicle to jump or hesitate which is uncomfortable for the riders.

This disadvantage can be largely avoided by creating a control pressure by means of which the switching or shifting pressure is established. The two pressures are ideally steplessly varied. However, due to the necessity of normally using electrical components it is almost invariably necessary to provide a stepped variation of at least the control pressure.

Such an arrangement normally is constituted by a proportional magnet connected to the control valve and fed current in proportion to the pressure it is to exert on the control valve and, therefore, the pressure the control valve is to establish. Since an automotive vehicle generally operates with a 12-volt system, it is necessary to make the magnet respond to relatively small steps of relatively low voltage. Furthermore, it is necessary to reduce friction within the magnet to an absolute minimum.

Thus it is necessary that the control magnet be an extremely precise and carefully constructed element. Any variation from extremely exact tolerances will cause the system to malfunction so that this component must be of the absolute best grade and, therefore, very expensive. Any deviation from within a relatively narrow tolerance range cannot normally be adjusted out. Furthermore, such an extremely precise magnet often has a relatively short service life in a motor vehicle where it is subjected to considerable shock and physical stresses.

SUMMARY OF THE INVENTION

It is therefore an object of the present invention to provide an improved hydraulic pressure-control system.

Another object is the provision of an improved automatic-transmission system for an automotive vehicle which overcomes the above-given disadvantages.

Yet another object is to provide a pressure-control system which is relatively simple yet capable of producing a plurality of relatively closely spaced pressures.

These objects are attained in accordance with the present invention in a pressure-control valve having return or pilot surfaces which are stepped in a binary fashion and to which fluid is fed by respective solenoid valves.

Thus the valve body has a pilot face which is subdivided into a plurality of pilot surfaces which can be separately acted on by fluid pressure so as to produce a shift pressure which is just the pressure needed for the given motor speed or load. When three such binarily differently dimensioned surfaces are provided it is possible easily to achieve eight different pressure levels with the control valve.

In accordance with yet another feature of this invention, wherein the pressure-control system is used for an automatic transmission having a hydrodynamic fluid coupling, it is possible to obtain an extremely regular pressure stepping by providing between the solenoid valves and the source of fluid pressure a pressure-control valve. This ensures that the motor torque is not changed by the coupling. If, as is normally the case, the torque is changed by the hydrodynamic converter, a progressive pressure stepping is desired so that this pressure-limiting valve can be dispensed with.

According to yet another feature of this invention an electronic circuit means is provided which is connected to the vehicular accelerator pedal. This pedal steps a switch through a plurality of stages in which it controls the solenoid valves so as to switch them in and out at the appropriate intervals to obtain the desired shift pressure. As the switch is moved through its various positions according to this invention the current flow to the respective switching stages is not interrupted. This eliminates the possibility of burning the contacts and distinct switching of the various valves is obtained. According to this invention the circuit comprises relays controlled by the switch that is in turn operated by the accelerator pedal. Further inputs such as motor speed and shifting style can also be used by the electronic circuit to control these relays.

A well defined pressure drop is obtained in accordance with another feature of this invention in a switching operation of the above-given type in an automatic automotive-vehicle transmission by further controlling the programmed load switch in dependence on the position of the input element, that is the accelerator pedal, and of the operation switch with a threshold device. Thus, everytime a so-called "shift" signal is produced the various solenoid valves are operated to reduce the pressure.

The duration of the "shift" signal is controlled in accordance with the various inputs. Some of these inputs may be the accelerator-pedal position, the change of the motor speed, the transmission speed, as well as the information whether an upshift or downshift is desired. Thus it is possible to control the individual shiftings separately and to vary the duration of the pressure drop in accordance with particular operating conditions. This is best achieved in accordance with this invention merely by making the "shift" signal periodic or intermittent and varying the period in accordance with any of these operating conditions.

According to yet another feature of this invention the "shift" signal is periodic and the pulse length is determined by a comparison of a reference value with an actual value that is determined by the motor speed. The error signal so generated controls the various relays and the reference signal may be constant or variable and in part determined by other operating conditions. This allows the control process to mesh nicely with the operation of the torque converter. The closed control system thereby makes it possible to shift without abrupt accelerations or decelerations. If the reference value described above is limited to a few operational characteristics it is possible to produce this control system with relatively few and inexpensive elements. In addition such construction greatly reduces malfunction and increases the safety of the system, because the configuration of the pressure converter is not exceeded.

The system according to the present invention gives a hysteresis-free controlling which is reproducible under virtually any working conditions. The system is not sensitive to fouling by dirt and does not tend to oscillate or hunt. In addition internal resonances in the circuit are almost impossible. It is possible very easily to adjust the pressure regulator by changing the biasing force in a biasing spring bearing on the valve body of the valve. The various electronic elements are relatively simple and can easily be replaced without having to readjust or rebuild the system.

Extremely advantageous pressure relationships are obtained when used to form an evenly progressive shift-pressure curve in both the highly and limitedly sloped regions of this curve. This is particularly applicable to automatic transmissions with hydrodynamic torque converters having fine subdivisions of the lower region and coarser subdivisions in the upper pressure regions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

SPECIFIC DESCRIPTION OF PREFERRED EMBODIMENTS

Figure 1:
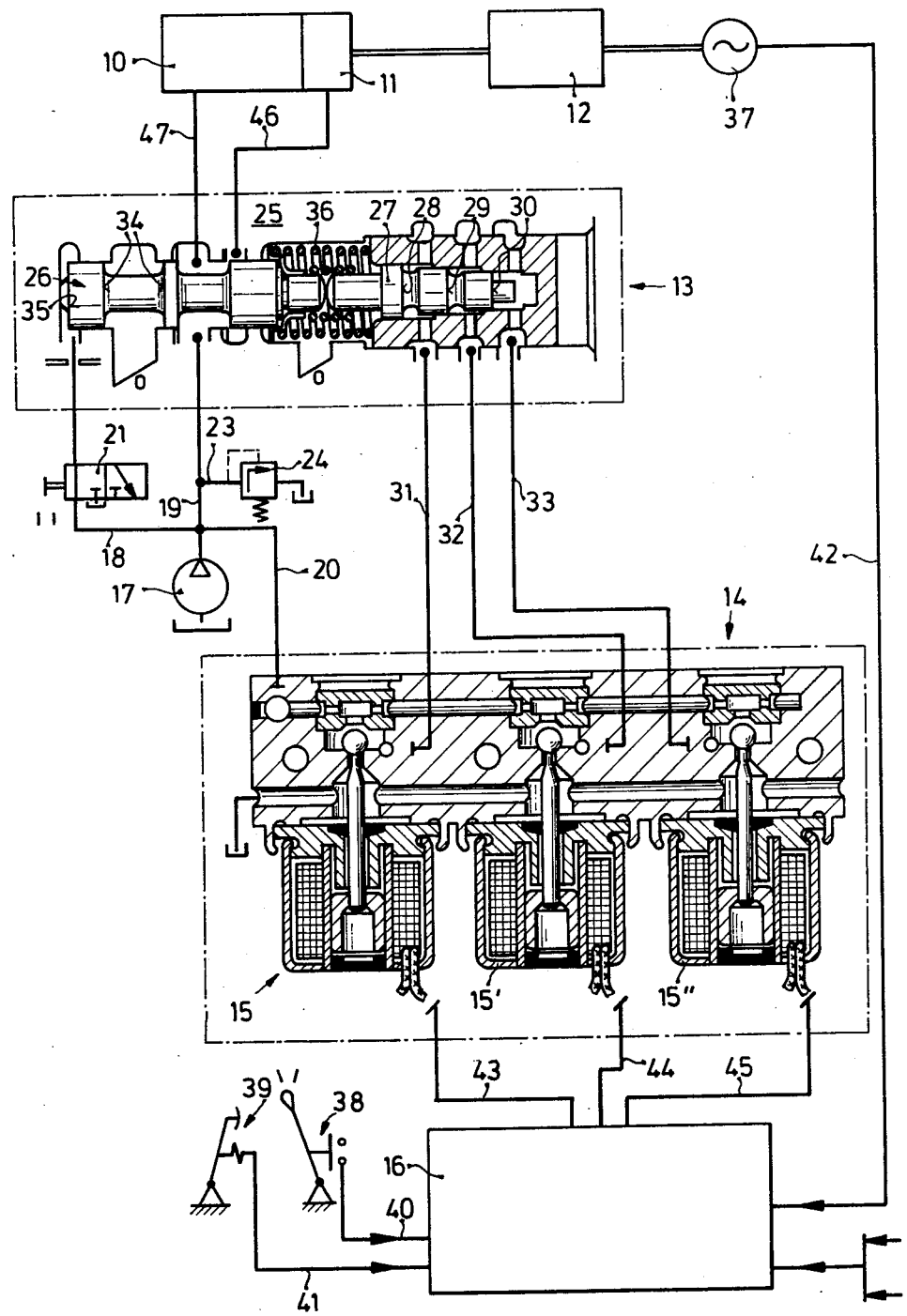
FIG. 1 is a largely schematic view of the system according to this invention.

As shown in FIG. 1 an automotive-vehicle transmission 10 is connected via a torque converter 11 to the engine 12 of the vehicle. This transmission 10 includes various clutches and brakes which are fed a hydraulic fluid whose pressure is determined by the loading, so as to achieve the proper transmission ratio between the engine 12 and the motor-vehicle wheels. The shifting pressure and the converter pressure fed to the torque converter 11 are produced by a control valve 13 connected to three solenoid valves 15, 15', and 15" carried in a valve block 14. An electronic control circuit 16 is connected to the valve block 14. In addition a pump 17 has a high-pressure output side 18 connected through a reversing valve 21 to the valve 13 and through a high-pressure line 19 also to this valve 13. A branch line 23 is connected between the high-pressure line 19 and a pressure-limiting valve 24 connected on its other side to the low-pressure side of the system. This valve 24 serves to limit the pressure in the system to prevent damage to the components thereof.

The valve 13 has a housing 25 in which is slidable a control slider 26 and, axially aligned therewith, a further control slider 27. The latter slider 27 has three pilot surfaces 28, 29, and 30. The surface 28 has an effective surface area equal to a seventh of the overall surface area of the three surfaces 28–30. Surface 29 is equal to two-sevenths and surface 30 four-sevenths. Thus it is possible to obtain a binary control using these surfaces 28–30. In addition the element 26 has an oppositely effective surface 35 which is greater than the overall surface area of the pilot faces 28–30 by one-seventh. Three pressure lines 31–33 connect the chambers at the pilot faces 28–30 to the respective solenoid valves 15, 15' and 15" which are connected on the other side to a line 20 going to the high-pressure side of the pump 17. The other side of each of these valves 15, 15', and 15" is connected to the reservoir or low-pressure side of the system, and these valves are so set up that when electrically energized they disconnect the respective control surface from the pressure line 20 and connect it to the reservoir.

The valves 15, 15', and 15" are energized through respective electrical wires 43, 44 and 45 connected to the control circuit 16. In addition the tachometer 37 operated by the engine 12 generates an analog output which is fed through a line 42 to this control circuit 16. The accelerator pedal 39 of the automotive vehicle is connected through a mechanical link 41 to the control circuit and the gear-shift lever 38 is connected via a line 40 to this control circuit 16.

Figure 1A:
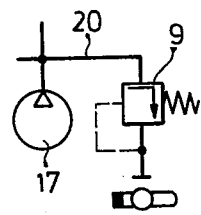
FIG. 1a is a detail of an alternative form of this invention.

FIG. 1a shows how it is possible to connect in the line 20 between the valves 15, 15', and 15" and the pump 17 a pressure-regulating valve 19. With this arrangement it is possible to obtain a very even stepping of the pressure, as can be advantageous with those types of automotive transmissions having fluid couplings. As will be described below this allows the obtention of eight regularly spaced steps.

Figure 2:
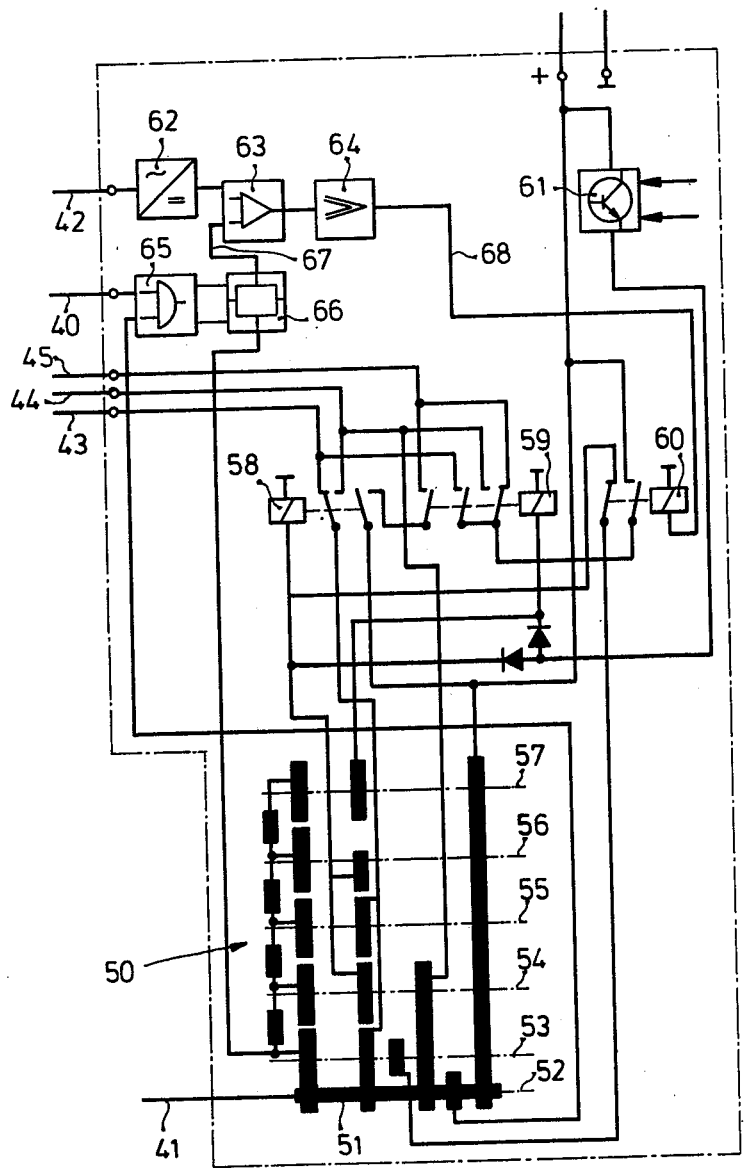
FIG. 2 is a schematic view of a detail of FIG. 1.

As shown in FIG. 2 the circuit 16 includes a switch 50 having a wiper 51 connected physically to the accelerator pedal 39 and displaceable between six positions 52–57. The various contacts of the switch 50 are connected to the poles and armatures of relays 58, 59, and 60 which are wired to the lines 43, 44, and 45 so as to energize them in binary fashion. An electronic clock 61 is connected via isolating diodes to the relays 58 and 59 and serves to control the length of the shift signal in the circuit 16.

The line 42 from the tachometer 37 is connected to the input of an analog/digital converter 62 whose output is connected to one input of a comparator 63 whose output in turn is connected through an amplifier 64 and line 68 to the armature of the relay 60. The other input of the comparator 63 is connected through a resistance chain 66 to a row of resistors 48 of the switch 50. In addition this resistance chain 66 is connected to the output of a logic device 65 receiving an input through the line 40 from the gearshift lever and mainly operated to prevent the transmission from shifting into its uppermost ranges for hill climbing and the like.

Relay 60 will therefore be energized when one of the inputs of the comparator 63 is greater than the other input, so that it will be a function of an actual value generated by the tachometer 37 and a reference signal determined by the resistance chain 66 and the row of resistors 48. The relays 58 and 59 will be closed periodically by the circuit 61 regardless of the position of the switch 50. The closing period is every 0.5 seconds. When all three of the lines 43, 44, and 45 are energized, as happens with the wiper 51 in position 52 or 53 with the relay 60 energized or with the wiper in any of the positions 52–57 with the relays 58 and 59 closed by the circuit 61 and the relay 60 energized, all three valves 15, 15' and 15" will similarly be energized and all of the chambers at the surfaces 28, 29 and 30, respectively, will be connected to the reservoir of the system. This will cause the slider 26/27 to move all the way to the right and allow fluid to flow from the line 19 past the right-hand control surface 34 into the sink of the valve.

Figure 3:
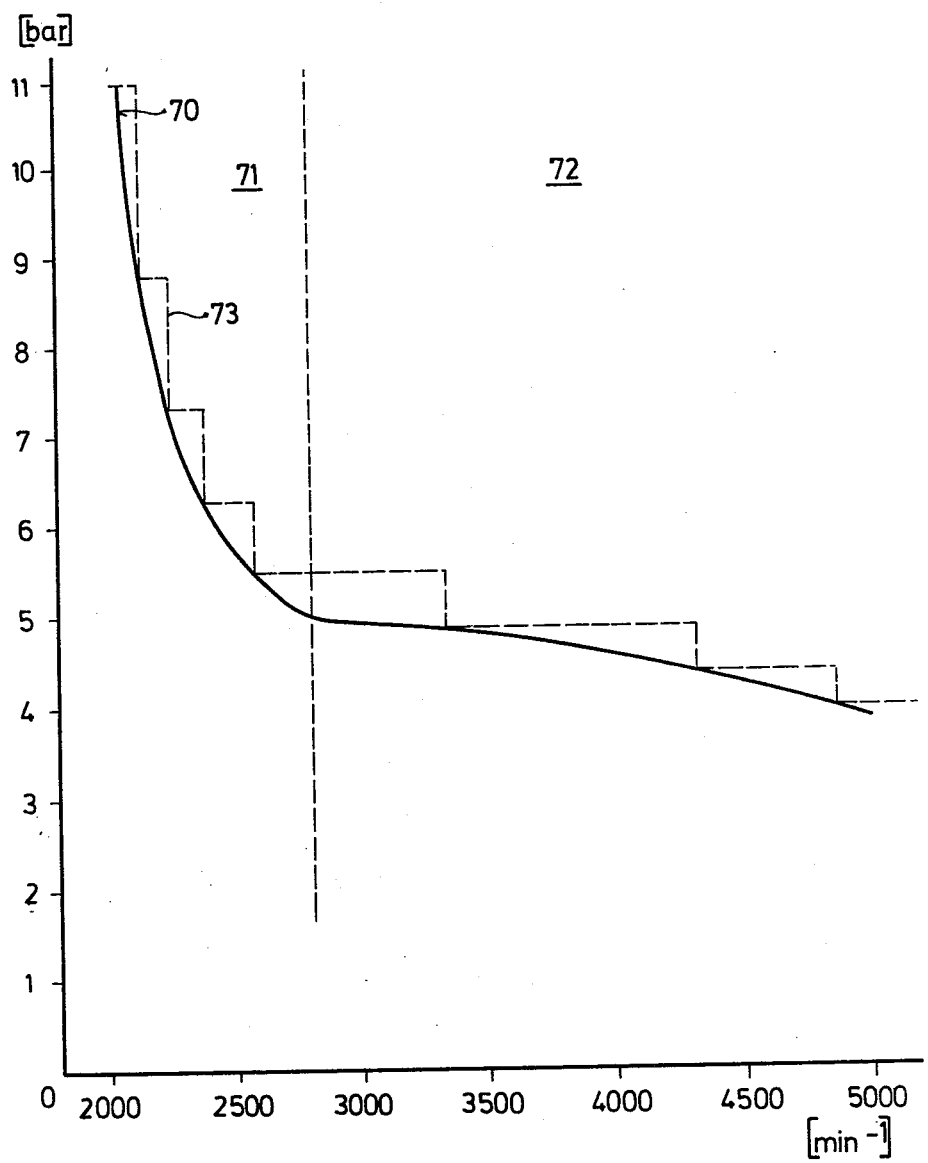
FIG. 3 is the characteristic curve for an eight-step arrangement.

FIG. 3 shows on the horizontal the motor speed in revolutions per minute and on the vertical the shifting pressure in bars. The switching pressure curve 70 for the transmission 10 has in the converting range 71 a sharply dropping slope and in the coupling range 72 a relatively flat slope. Shifting of the transmission 10 is to be effected at particular pressures on the line 70 so that the shifting operation is optimized. In accordance with this invention a stepped switching pressure 73 is used which is close to the curve 70 in both of the regions 71 and 72, particularly in the coupling region 72. Thus it is possible in automatic transmissions with converters to use only a few steps to closely approximate the ideal curve 70 for the shifting pressure.

Figure 4:
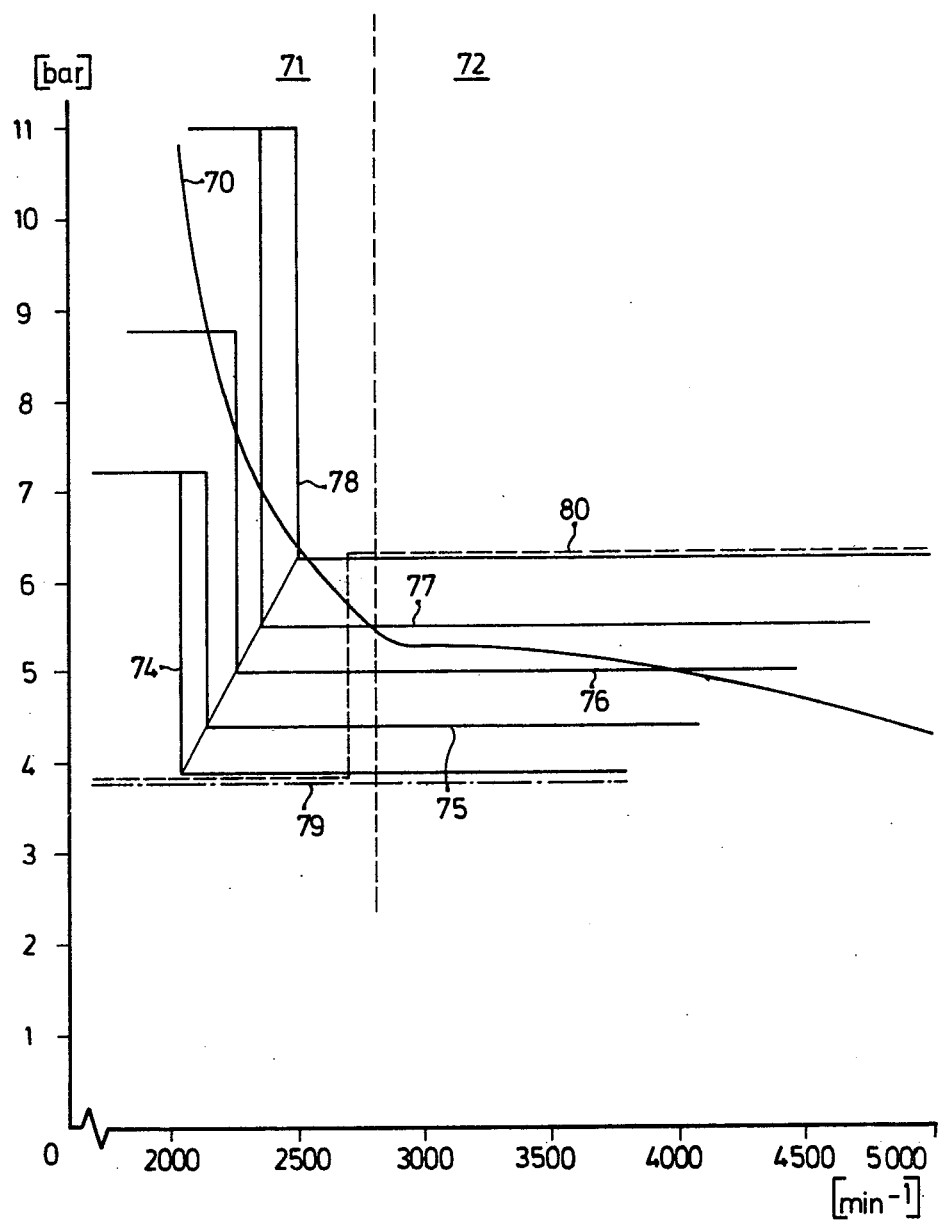
FIG. 4 is the shifting curve according to this invention.

FIG. 4 shows the practical embodiment wherein the shift curve 70 of FIG. 3 is superimposed over five characteristic lines 74–78 with their length extended in the regions 71 and 72. These lines 74 to 78 correspond to the extent of opening of the butterfly valve in the carburetor of the engine 12. Line 74 corresponds to an angle of from 5° to 22°, line 75 to an angle between 23° and 27°, line 76 to an angle of between 28° and 35°, line 77 to an angle of between 36° and 45°, and line 78 to an angle of from 46° to 100°. The dot-dash line 79 corresponds to a 0° opening and a position of the lever 8 for normal shifting. The dashed line 80, however, also corresponds to an opening angle of 0°, but in a position of the lever 8 for limited shifting wherein the transmission cannot go into its upper lowest ratio speeds.

The system operates as follows, using a standard planetary-gear transmission of the Trilok type:

The gearshift lever 38 is switched from the neutral to the automatic position. The shifting pressure in neutral is one bar and is switched to four bars as the pedal 39 is moved from the bottom position. The forward clutch is slowly actuated from one bar to four bars. If the lever 38 is moved from neutral into reverse, the valve 21 is moved to the left in FIG. 1 so as to depressurize the chamber at the face 35. This causes the transmission 10 to be actuated with the maximum force as determined by the valve 24, which is set at 15 bars. The pressure rises slowly in the appropriate couplings and brakes of the transmission 10 for reverse from 1 bar to 16 bars. The pressure in reverse is independent of loading, as now further shifting operations can take place.

When moving forward, however, at full speed in first gear the pressure rises from 4 bars to 11 bars. The bar of the switch 50 of FIG. 2 is moved from position 52 toward position 57. This causes the solenoid valves to be successively shifted. The relay 58 imparts to the shifting operation particular relationships, in particular when the bridge 51 passes from 54 to 55.

Further travel with the accelerator pedal 39 all the way down and the motor speed continuously increasing will cause the shifting pressure to drop from 11 to 6.3 bars. This takes place in dependence on the passing-over of the hydrodynamic converter from the converting into the coupling phase. The relay 60 is switched in accordance with the operation of the comparator 63 in dependence on the position of the switch 50 fed into the one input 67 of the comparator 63 and the motor speed fed into the other input thereof.

When during further travel it is necessary to switch from first and second into third gear, then under maximum actuation of the accelerator pedal 39 the pressure is dropped again from 6.3 bars to 4 bars, once again in accordance with the motor speed. If the change of the motor speed has gone even smaller yet then the pressure will rise back to 6.3 bars. If it increases it will drop again. This operation is limited to 0.5 seconds. Thus an optimally soft shifting operation independent of the various conditions of the transmission is obtained. Limiting of the shifting operation to 0.5 seconds prevents the plates of any clutches in the transmission from overheating.

For downshifting, once again with the accelerator pedal 39 actuated to its maximum, the pressure remains in the same level, but without regard to motor speed for a time of 0.5 seconds or whatever other time is established by the circuit 61. This also effects a smooth shifting down which of course takes place differently from upshifting. The brakes for the second gear are gently actuated and stop slipping automatically as the synchronization point is passed. The first-gear free wheel which is always provided allows the motor to turn at a high speed when the brakes of the respective speeds of the transmission are open.

Limiting switches are standard in automatic transmissions in order to prevent excessive upshifting and downshifting, as for instance would otherwise occur in a sinuous hill-climbing road. In this case no particular measures need be taken in the pressurizing system. Should, for instance, the transmission be used for braking it is necessary to pressurize the transmission accordingly. As shown in FIG. 4 with increasing motor speed and position of the pedal 39 at minimum speed the switching pressure is raised so that the increased braking torque can be transmitted through the various clutches and brakes. Thus, the switch 50 and gearshift arm 38 each have a contact which ensures that the operational amplifier 63, at low motor speed, switches in the relay 60 and ensures a pressure of four bars, and switches up to 6.3 bars with increasing motor speed so that the relay 60 again switches out.

It will be understood that each of the elements described above, or two or more together, may also find a useful application in other types of hydraulic systems differing from the types described above.

While the invention has been illustrated and described as embodied in an automotive-vehicle automatic transmission, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A system comprising:
   a source of pressurized fluid;
   a pressure-operated load;
   an engine having an accelerator pedal;
   a valve connected between said source and said load and having a valve body displaceable to control the flow of said fluid to said load and having a plurality of binarily stepped pilot surfaces;

means defining a pressurizable chamber at each of said surfaces;

a plurality of solenoid valves each between said load and a respective one of said chambers;

clock means for periodically generating a "shift" signal;

electrical circuit means connected to said pedal and said solenoid valves for electrically energizing said solenoid valves in accordance with pedal position, said circuit means being connected to a source of electricity and being switchable through a plurality of steps, said circuit means being responsive to said "shift" signal and maintaining electrical contact between at least a one of said solenoid valves and said source of electricity while moving through said steps;

means for generating an output representing engine speed; and means for comparing said output with a reference value and for generating an error signal controlling said means for generating said "shift" signal.

2. In a hydraulic system wherein a control valve is connected between a source of pressurized fluid and a load and has a valve body displaceable to control the flow of said fluid to said load, the improvement comprising:

a plurality of pilot surfaces of binarily stepped effective surface areas on said valve body, each of all but the smallest of said surface areas being substantially twice as large as the respective next smallest surface area;

means defining a pressurizable chamber at each of said surfaces;

a plurality of solenoid valves each between said source and a respective one of said chambers; and electronic control means connected to said solenoid valves for operating same in binary sequence and thereby increasing the pressure effective on said valve body at said pilot surfaces in uniform increments.

3. The improvement defined in claim 2, further comprising a pressure-control valve between said solenoid valves and said load.

4. The improvement defined in claim 2 wherein said system further comprises an accelerator pedal, said improvement further comprising electrical circuit means including said control means and connected between said pedal and said solenoid valves for electrically energizing said solenoid valves in accordance with pedal position.

5. The improvement defined in claim 4 wherein said electrical circuit means is connected to a source of electricity and is switchable through a plurality of steps, said circuit means maintaining electrical contact between at least a one of said solenoid valve and said source of electricity while moving through said steps.

6. The improvement defined in claim 5 wherein said electrical circuit means is responsive to speed of an engine.

7. The improvement defined in claim 6 wherein said electrical circuit means is responsive to an analog/digital "shift" signal.

8. The improvement defined in claim 6 wherein said electrical circuit means includes a clock for periodically generating a "shift" signal, said circuit means being responsive to said signal.

9. The improvement defined in claim 8, further comprising means for varying the period of said "shift" signal in response to one of the following conditions: accelerator-pedal position, engine speed, transmission speed.

10. The improvement defined in claim 8 wherein said circuit means includes means for varying the period of said "shift" signal.

11. A pressure-controlled hydraulic system comprising:

a source of fluid under pressure having a high-pressure side and a low-pressure side;

a pressure-operated load;

a control valve including a displaceable valve body having on one side a main face, on its opposite side a plurality of differently dimensioned pilot faces, and a control edge, said pilot faces together having a given total effective surface area, one of said pilot faces having an individual effective surface area equal to one-seventh of said total area, another of said pilot faces having an individual effective surface area equal to two-sevenths of said total area, and yet another of said pilot faces having a individual effective surface area equal to four-sevenths of said total area, and a housing surrounding said body and forming a main compartment at said main face, a plurality of pilot compartments each at a respective pilot face, and a flow compartment at said control edge;

conduits connecting said flow compartment and said main compartment to said high-pressure side;

a plurality of electrically energizable solenoid valves each connected between said high-pressure side and a respective pilot compartment;

means connecting said flow compartment to said load and to said low-pressure side for pressurization of said load in accordance with the position of said control edge;

a displaceable input element; and electrical circuit means connected between said input element and said solenoids for actuating said solenoids in accordance with the position of said input element.

12. The system defined in claim 11 wherein said pilot faces together have a given total effective surface area, one of said pilot faces having an individual effective surface area equal to one-seventh of said total area, another of said pilot faces having an individual effective surface area equal to two-sevenths of said total area, and yet another of said pilot faces having an individual effective surface area equal to four-sevenths of said total area.

13. The system defined in claim 11 wherein said main face has an individual effective surface area equal to one and one-seventh of said total area.

14. The system defined in claim 11 wherein said valve body is slidable and stepped at said pilot faces.

15. The system defined in claim 14 wherein said load is an automatic automotive-vehicle transmission and said input element is an accelerator pedal.

* * * * *